United States Patent
Ebelsberger et al.

(10) Patent No.: US 10,818,453 B2
(45) Date of Patent: Oct. 27, 2020

(54) ASSEMBLY HAVING A GAS SPRING FOR A CABLE ROTARY-PENDULUM KINEMATIC SYSTEM AND USE OF THE ASSEMBLY FOR SWITCHING

(71) Applicants: SIEMENS AKTIENGESELLSCHAFT, Munich (DE); Maria Elisabeth Mock

(72) Inventors: Gerit Ebelsberger, Munich (DE); Georg Bachmaier, Munich (DE); Reinhard Freitag, Munich (DE); Matthias Gerlich, Munich (DE); Randolf Mock, Hohenbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/609,603

(22) PCT Filed: Apr. 18, 2018

(86) PCT No.: PCT/EP2018/059834
§ 371 (c)(1),
(2) Date: Oct. 30, 2019

(87) PCT Pub. No.: WO2018/202422
PCT Pub. Date: Nov. 8, 2018

(65) Prior Publication Data
US 2020/0152406 A1 May 14, 2020

(30) Foreign Application Priority Data

May 5, 2017 (DE) .................. 10 2017 207 629

(51) Int. Cl.
*H01H 33/32* (2006.01)
*H01H 33/40* (2006.01)
(Continued)

(52) U.S. Cl.
CPC ............... *H01H 33/42* (2013.01); *F16F 9/04* (2013.01); *F16F 9/049* (2013.01); *F16F 9/44* (2013.01);
(Continued)

(58) Field of Classification Search
CPC .......... H01H 3/36; H01H 3/605; H01H 33/32; H01H 33/40; H01H 33/42;
(Continued)

(56) References Cited

U.S. PATENT DOCUMENTS 3,037,765 A * 6/1962 Francis ................... F16F 9/049
267/64.14
4,006,329 A * 2/1977 Hellman ................. H01H 35/28
200/83 D (Continued)

FOREIGN PATENT DOCUMENTS

| DE | 2843368 A1 | 4/1980 |
| GB | 1182782 A | 3/1970 |
| WO | WO2016110430 A1 | 7/2016 |

OTHER PUBLICATIONS

PCT International Search Report and Written Opinion of International Searching Authority dated Aug. 2, 2018 corresponding to PCT International Application No. PCT/EP 2018/059834 filed Apr. 18, 2018.

*Primary Examiner* — William A Bolton
(74) *Attorney, Agent, or Firm* — Lempia Summerfield Katz LLC

(57) ABSTRACT

An assembly for preloading a cable rotary-pendulum kinematic system is provided. The assembly includes a rotational body of a cable rotary-pendulum kinematic system. The rotational body is configured to rotate about the longitudinal axis thereof and is immovable in the direction of the longitudinal axis. The assembly further includes at least one gas spring surrounding the rotational body and which may (Continued)

be compressed in the direction of the longitudinal axis. The assembly further includes primary cables, which force-lockingly connect the rotational body to the gas spring in such a way that a rotational motion of the rotational body causes compression of the gas spring, whereby the assembly is preloaded.

17 Claims, 3 Drawing Sheets

(51) Int. Cl.
*H01H 33/42* (2006.01)
*H01H 33/662* (2006.01)
*F16F 9/04* (2006.01)
*F16F 9/44* (2006.01)
*F16H 19/06* (2006.01)
*H01H 3/60* (2006.01)

(52) U.S. Cl.
CPC ......... *F16H 19/0654* (2013.01); *H01H 3/605* (2013.01); *H01H 33/32* (2013.01); *H01H 33/40* (2013.01); *H01H 33/66238* (2013.01); *F16F 2224/0208* (2013.01); *F16F 2224/0241* (2013.01)

(58) Field of Classification Search
CPC ..... H01H 33/66238; H01H 33/30; F16F 9/04; F16F 9/049; F16F 9/44; F16F 2224/0208; F16F 2224/0241; F16H 19/0654; F16H 19/065
USPC ....... 218/154, 140, 120, 135, 153; 200/83 C, 200/83 D
See application file for complete search history.

(56) References Cited

U.S. PATENT DOCUMENTS

| | | | |
|---|---|---|---|
| 4,007,406 A * | 2/1977 | Weisbrod | H01G 5/14 361/279 |
| 4,024,363 A * | 5/1977 | Marsing | H01H 33/004 200/83 R |
| 9,147,542 B2 * | 9/2015 | Parashar | H01H 33/66238 |
| 2014/0083288 A1 * | 3/2014 | Tatsumi | F04B 45/02 92/47 |
| 2014/0260715 A1 | 9/2014 | Smith | |

\* cited by examiner

ASSEMBLY HAVING A GAS SPRING FOR A CABLE ROTARY-PENDULUM KINEMATIC SYSTEM AND USE OF THE ASSEMBLY FOR SWITCHING

The present patent document is a § 371 nationalization of PCT Application Serial No. PCT/EP2018/059834, filed Apr. 18, 2018, designating the United States, which is hereby incorporated by reference, and this patent document also claims the benefit of German Patent Application No. 10 2017 207 629.1, filed May 5, 2017, which is also hereby incorporated by reference.

TECHNICAL FIELD

The disclosure relates to an arrangement for prestressing a cable/rotary pendulum kinematic system, in the case of which arrangement a rotational movement of a rotational body is converted with the aid of wound cables into a translational movement of a winding body, the rotational body being loaded with a torque in the prestressed state. The disclosure also relates to the use of the arrangement for switching.

BACKGROUND

High short circuit currents mean high mechanical and thermal loads for medium voltage switching systems and operating equipment. The mechanical loading is proportional to the square of the current and is defined by the magnitude of the short circuit surge current which occurs a few milliseconds after the beginning of the short circuit. The thermal loading is defined by way of the temporal current integral, into which, in addition to the magnitude of the current, the short circuit duration is substantially also incorporated. In order to reduce the loads as a result of short circuit currents on the operating equipment, it is therefore necessary to considerably reduce both the amplitude of the short circuit surge current and the short circuit duration.

Rapid switches with an integrated current limiter may be capable of providing this by limiting the short circuit surge current effectively until the rapid switch interrupts the current circuit completely. In this way, it might be possible to limit the current integral to such an extent that the thermal loads of the operating equipment remain within reasonable limits in the case of a short circuit.

Laid open specification WO 2016/110430 A1 describes a "coupling member for an electric switching unit", by way of which a switching operation may be carried out with the required dynamic. Here, a rotational movement of the coupling member is converted with the aid of wound cables into an upward and downward movement of a winding body or tappet and therefore into a switching operation. In order to initiate the rotation of a cable/rotary pendulum kinematic system of this type, a set of springs which is connected in a non-positive manner via a plurality of primary cables to the coupling member serves as a force source or as an energy store. The content of laid open specification WO 2016/110430 A1 is a constituent part of the patent application.

In the prestressed state, the springs exert a force on the primary cables which are twisted with respect to the rest position. Because the primary cables act on the periphery of the coupling member, a torque is thus exerted on the latter, which torque sets the rotation of the cable/rotary pendulum kinematic system in motion. The spring stiffness, the prestressing force, and the geometric ratios, which are defined by way of the details of the force transmission via the wound cables and the primary cables, are designed in such a way that switching times in the range of 3 ms may be realized.

In view of the extremely high switching dynamic of the coupling member, it proves disadvantageous that both flexural and longitudinal vibrations are excited in the springs as a result. The amplitudes of the vibrations are transmitted to the movement of the winding body and have an unfavorable effect on a switching operation. During opening of the switch, in particular, superimposed vibrations of the springs, which are coupled over to the winding body via primary cables and wound cables, may impair the function of the current limitation and the breakaway of the spark.

Laid open specification DE 28 43 368 A1 discloses a gas pressure spring for damping the switching mechanism during the switching movement of electric circuit breakers.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an object of the disclosure to avoid the above-described disadvantages and to specify a solution which makes a switching operation more reliable.

According to the disclosure, instead of spiral or torsion springs, for example, a gas pressure spring is used. The gas pressure spring may include two concentrically arranged metal bellows which, closed by way of a common base plate and a cover plate, form a hermetically sealed container for a gas. The container may be filled with gas by way of a valve which is attached on the cover. The effective radii of the two metal bellows are dimensioned in such a way that, for example, in the case of a gas pressure of 50 bar, a force on the base or cover plate of approximately 20 kN results. The primary cables which transmit the prestressing force to the coupling member of laid open specification WO 2016/110430 A1 are hooked with one end on the cover plate of the gas pressure spring and are hooked with the other end on the coupling member. In the pressureless state, the primary cables are installed in such a way that they are tautened and prestressed slightly after being hooked in. After being hooked into the cover plate of the gas pressure spring and into the rotational body of the rotary pendulum kinematic system, the primary cables are oriented radially in a plan view of the cover plate. An arrangement of this type is used in the case of electric circuit breakers.

The disclosure recites an arrangement for prestressing a cable/rotary pendulum kinematic system, in the case of which arrangement a rotational movement of a rotational body is converted with the aid of wound cables into a translational movement of a winding body, the rotational body loaded with a torque being in the prestressed state. The arrangement includes a rotational body of a cable/rotary pendulum kinematic system, which rotational body is to be prestressed, may be rotated about its longitudinal axis and is immovable in the direction of the longitudinal axis. The arrangement further includes at least one gas pressure spring which encloses the rotational body and may be compressed in the direction of the longitudinal axis. The arrangement further includes primary cables which connect the rotational body to the gas pressure spring in a non-positive manner in such a way that a rotational movement of the rotational body brings about a compression of the gas pressure spring, as a result of which the arrangement is prestressed.

The disclosure affords the advantage that no undesired vibrations which are caused by way of springs occur in the case of rapid switching operations.

In one development, the gas pressure spring has a base plate and a cover plate which is oriented parallel to the former.

In a further refinement, the gas pressure spring has at least one metal bellows which may be filled with gas and is arranged between the cover plate and the base plate.

In a further embodiment, the metal bellows may be encapsulated with a carbon fiber-reinforced plastic. Vibrations are damped even more effectively as a result.

In a further refinement, the primary cables may be fastened with one end in the cover plate and with the other end to the rotational body. An effective transmission of force from the gas pressure spring to the rotational body occurs as a result.

Furthermore, in a gas-filled state of the gas pressure spring, the pressure of the gas in the metal bellows may be at least 50 bar.

In one refinement, the rotational body is of tubular configuration. Space is produced in its interior as a result.

Furthermore, the arrangement may have two gas pressure springs which are arranged on one another in a mirror-inverted manner. As a result, the bearing forces of the rotational body which act by way of the gas pressure springs cancel each other out.

In one development, the base plates of the two gas pressure springs lie on one another.

Moreover, the arrangement may have an equalizing bore or a throttle valve through the base plates which equalizes the gas pressure between the two gas pressure springs.

The disclosure also recites the use of the arrangement in an electric circuit breaker for prestressing a cable/rotary pendulum kinematic system.

BRIEF DESCRIPTION OF THE DRAWINGS

Further special features and advantages of the disclosure become clear from the following explanations of a plurality of exemplary embodiments on the basis of diagrammatic drawings, in which.

DETAILED DESCRIPTION

Figure 1:
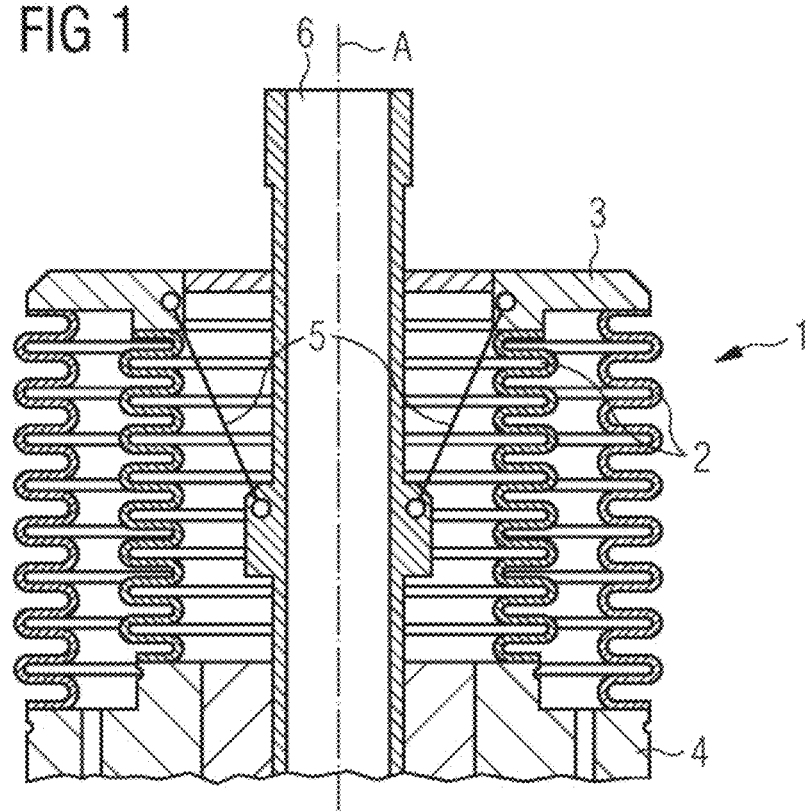
FIG. 1 depicts an example of a sectional view through a gas pressure spring which is arranged on a rotational body.

FIG. 1 shows a cross section through a gas pressure spring 1 which includes two concentrically arranged metal bellows 2 which, in a manner which is closed by way of a common base plate 4 and a cover plate 3, form a hermetically sealed container for a gas. The container may be filled with gas by way of a valve (not shown) which is installed into the cover plate 3. The effective radii of the two metal bellows 2 are dimensioned in such a way that, for example in the case of a gas pressure of 50 bar, a force on the base or cover plate 3, 4 of approximately 20 kN results.

The rotational body 6 of a cable/rotary pendulum kinematic system in accordance with laid open specification WO 2016/110430 A1 runs through the gas pressure spring 1 in a concentrically arranged manner. Primary cables 5 which transmit the prestressing force to the cable/rotary pendulum kinematic system are hooked with one end on the cover plate 3 of the gas pressure spring 1, and with the other end on the rotational body 6. In the pressureless state of the gas pressure spring 1, the primary cables 5 are installed in such a way that they are tautened and prestressed slightly after being hooked in. After being hooked into the cover plate 3 of the gas pressure spring 1 and into the rotational body 6 of the cable/rotary pendulum kinematic system, the primary cables 5 are oriented radially in a plan view of the cover plate 3, as may be seen in FIG. 2.

Figure 2:
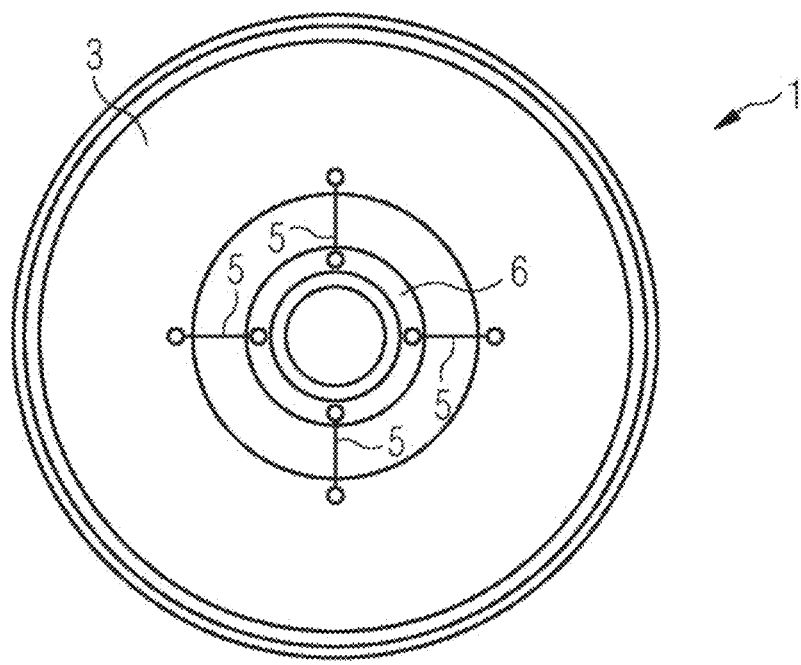
FIG. 2 depicts an example of a plan view of a gas pressure spring which is arranged on a rotational body.
Figure 3:
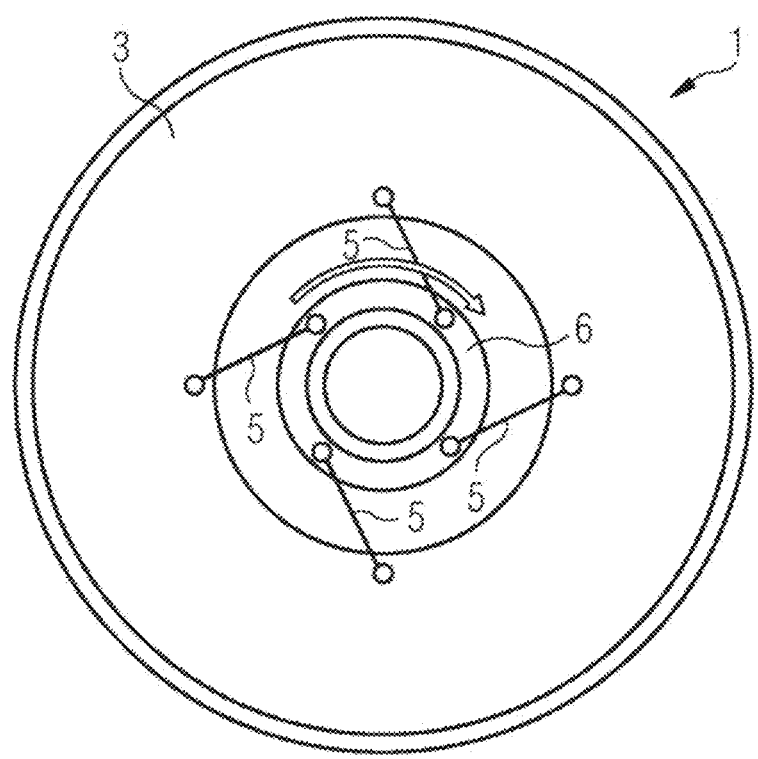
FIG. 3 depicts an example of a plan view of a gas pressure spring which is arranged on a rotational body, with a rotational body which is turned by 45 degrees.

For the description of FIG. 2 and FIG. 3, it is to be assumed first of all that the rotational body 6 is prevented by way of a suitable bearing from moving in the direction of the longitudinal axis A. Rather, it is capable of carrying out merely a rotation about the longitudinal axis A. If the gas pressure spring 1 is filled with gas, a pressure is built up which acts on the cover plate 3 in the direction of the longitudinal axis A and therefore exerts a tensile force on the primary cables 5.

If the rotational body 6 is rotated out of the original position by a predefinable angle by way of a corresponding device or mechanism (for example, by way of a motor), as shown in FIG. 3, the pressurized gas pressure spring 1 generates a force on the primary cables 5 which generate a torque at the hook-in points of the primary cables 5, which torque corresponds to the tangential component of the force which is transmitted by way of the primary cables 5 to the rotational body 6 multiplied by the radius of the hook-in point on the rotational body 6. A winding body (not shown), which is situated in the interior of the rotational body 6, may be set in a longitudinal movement in accordance with laid open specification WO 2016/110430 A1 by way of wound cables.

At a pressure of 50 bar in the case of a rotation of the rotational body 6 of 45 degrees about the longitudinal axis A, one exemplary design supplies an initial torque of 300 Nm which acts via the rotational body 6 on the cable/rotary pendulum kinematic system. Because the cable length does not change during dynamic operation, the cover plate 3 is pulled downward in the direction of the base plate 4 by way of the rotation (FIG. 1), and the gas pressure spring 1 is therefore compressed. This leads to a slight modulation of the gas pressure on account of the pendulum movement of the rotational body 6.

In the case of the arrangement which is shown in FIG. 1, a resulting considerable force would act on a bearing for suppressing a movement of the rotational body 6 in the axial direction as soon as the gas pressure spring 1 is pumped to its nominal pressure. In the example, the nominal pressure is 50 bar, which results in the case of the predefined geometry of the gas pressure spring 1 in a force on the bearing of approximately 20 kN.

Figure 4:
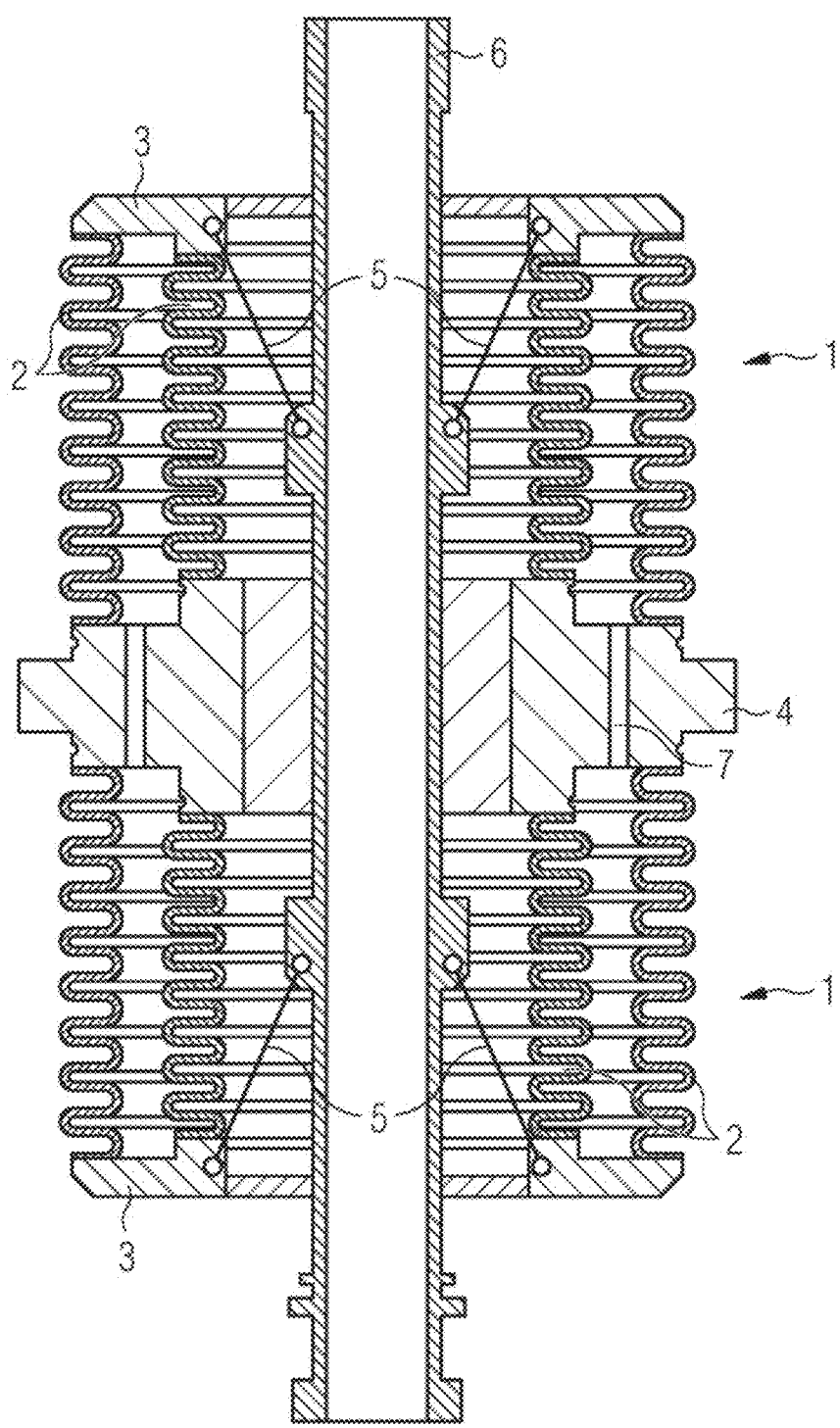
FIG. 4 depicts an example of a sectional view through two gas pressure springs which are arranged symmetrically on a rotational body.

A bearing of this type, which is subjected to high forces, may be avoided completely if a symmetrical arrangement is realized, as shown in FIG. 4. As may be gathered from the illustration, two gas pressure springs 1 are provided, the force direction of which is opposed in the case of pressurization. In the case of identical dimensioning of the two gas pressure springs 1 and at an identical gas pressure, the forces which the two gas pressure springs 1 exert on the respective cover plates 3 via the primary cables 5 on the rotational body 6 are identical in opposite directions and therefore cancel each other out. A bearing for the compensation of axial forces is therefore not required. In contrast, the torques of the lower and upper primary cable arrangement act in the same direction, that is to say they are added.

In order to establish an equalization of the pressures in the two gas pressure springs 1, an equalizing bore 7 may optionally be provided, by way of which pressure equalization takes place. The equalizing bore 7 may have a flow throttle for suppressing pressure oscillations between the two gas springs 1.

As shown in FIG. 2 and FIG. 3, the number of primary cables 5 does not necessarily have to be four. For reasons of stability against buckling of the metal bellows 2, however, at least three primary cables 5 may be used per gas pressure spring 1 at angular spacings of 120°. Otherwise (of course with consideration of an appropriate construction), any desired number N of cables may be used, their angular spacing from one another being given by φ=360°/N.

In order to suppress longitudinal or flexural vibrations of the metal bellows 2, they may be surrounded by a CFC encapsulation. Vibrations are damped on account of the properties of the fiber/synthetic resin potting compound. Moreover, this may provide protection against the high dynamic loads which occur in the material of the metal bellows 2 in the case of the extremely short switching times of the cable/rotary pendulum kinematic system.

As a result of the extremely high switching dynamic, it is unavoidable that vibrations are excited in conventional prestressing springs (for example, spiral springs) which are used as energy stores for the cable/pendulum drive. The vibrations are also coupled over onto the drive via the wound cables and may cause the problems which have already been mentioned at the outset during switching.

The gas pressure spring 1 which is constructed from metal bellows 2 has to have a considerable advantage over this. The pressure of the gas in the gas pressure spring 1 which is formed by way of the metal bellows 2, the base plate 4 and the cover plate 3 follows the known relationship for ideal gases:

$$p*V = \text{const.} \tag{1}$$

where p is the pressure and V is the volume.

As has resulted, for example, from simulation calculations and experiments, vibrations of the metal bellows 2 do not have any significant influence on the volume V of the gas pressure springs 1 which is enclosed by way of the metal bellows 2 and therefore also do not have any significant influence on the pressure as a cause for the torque which acts on the rotational body 6 via the primary cables 5. In this way, disruptions as a result of unavoidable resonances are effectively decoupled.

A further advantage results from the concentric arrangement of the gas pressure springs 1 around the rotational body 6. This allows a compact overall design of this central drive unit.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described in greater detail by way of the exemplary embodiments, the disclosure is not restricted by way of the disclosed examples, and other variations may be derived therefrom by a person skilled in the art, without departing from the scope of protection of the disclosure.

The invention claimed is:

1. An arrangement of a cable/rotary pendulum kinematic system, the arrangement comprising:
a rotational body having a longitudinal axis, wherein the rotational body is configured to be rotated about the longitudinal axis, and wherein the rotational body is immovable in a direction of the longitudinal axis;
at least one gas pressure spring which encloses the rotational body and is configured to be compressed in the direction of the longitudinal axis; and
primary cables which connect the rotational body to the at least one gas pressure spring in a non-positive manner such that a rotational movement of the rotational body is converted into a translational movement, bringing about a compression of the at least one gas pressure spring, as a result of which the arrangement is pre-stressed.

2. The arrangement of claim 1, wherein the at least one gas pressure spring comprises a base plate and a cover plate, wherein the cover plate is oriented in parallel with respect to the base plate.

3. The arrangement of claim 2, wherein the at least one gas pressure spring further comprises at least one metal bellows,
wherein the at least one metal bellows is configured to be filled with gas, and
wherein the at least one metal bellows is arranged between the cover plate and the base plate.

4. The arrangement of claim 3, wherein the at least one metal bellows is encapsulated with a carbon fiber-reinforced plastic.

5. The arrangement of claim 4, wherein the primary cables are fastened with a first end of the primary cables in the cover plate and with a second end of the primary cables to the rotational body.

6. The arrangement of claim 5, wherein, in a gas-filled state of the at least one gas pressure spring, a pressure of the gas in the at least one metal bellows is at least 50 bar.

7. The arrangement of claim 6, wherein the rotational body comprises a tubular configuration.

8. The arrangement of claim 7, wherein the at least one gas pressure spring comprises two gas pressure springs arranged on one another in a mirror-inverted manner.

9. The arrangement of claim 8, wherein base plates of the two gas pressure springs lie on one another.

10. The arrangement of claim 9, further comprising:
an equalizing bore through the base plates,
wherein the equalizing bore is configured to equalize the pressure of the gas between the two gas pressure springs or to damp vibrations.

11. The arrangement of claim 1, wherein the rotational body comprises a tubular configuration.

12. The arrangement of claim 2, wherein the at least one gas pressure spring comprises two gas pressure springs arranged on one another in a mirror-inverted manner.

13. The arrangement of claim 12, wherein base plates of the two gas pressure springs lie on one another.

14. The arrangement of claim 13, further comprising:
an equalizing bore through the base plates,
wherein the equalizing bore is configured to equalize a gas pressure between the two gas pressure springs or to damp vibrations.

15. The arrangement of claim 3, wherein the primary cables are fastened with a first end of the primary cables in the cover plate and with a second end of the primary cables to the rotational body.

16. The arrangement of claim 3, wherein, in a gas-filled state of the at least one gas pressure spring, a pressure of the gas in the at least one metal bellows is at least 50 bar.

17. A method for switching an electric circuit breaker for prestressing a cable/rotary pendulum kinematic system, the method comprising:
   providing an arrangement of the cable/rotary pendulum kinematic system, the arrangement comprising a rotational body, a gas pressure spring, and primary cables, wherein the rotational body has a longitudinal axis and is immovable in a direction of the longitudinal axis, wherein the gas pressure spring encloses the rotational body, and wherein the primary cables connect the rotational body to the gas pressure spring; and
   rotating the rotational body about the longitudinal axis, wherein a rotational movement is converted into a translational movement, bringing about a compression of the gas pressure spring in the direction of the longitudinal axis, as a result of which the arrangement is prestressed.

\* \* \* \* \*